(12) United States Patent
Deiotte et al.

(10) Patent No.: US 7,570,841 B2
(45) Date of Patent: Aug. 4, 2009

(54) METHOD FOR DETERMINING A SET OF BOUNDARY POINTS IN A LATTICE

(75) Inventors: Raymond T. Deiotte, Colorado Springs, CO (US); Richard C. Shapiro, Colorado Springs, CO (US)

(73) Assignee: The Boeing Company, Chicago, IL (US)

(*) Notice: Subject to any disclaimer, the term of this patent is extended or adjusted under 35 U.S.C. 154(b) by 667 days.

(21) Appl. No.: 11/331,887

(22) Filed: Jan. 13, 2006

(65) Prior Publication Data

US 2008/0175433 A1 Jul. 24, 2008

(51) Int. Cl.
*G06K 9/32* (2006.01)
*G06K 9/00* (2006.01)
*G06K 9/40* (2006.01)

(52) U.S. Cl. .................... 382/300; 382/103; 382/266

(58) Field of Classification Search ............... 382/266, 382/300, 103, 106, 107; 348/113, 116, 117; 358/3.15, 525, 532
See application file for complete search history.

(56) References Cited

U.S. PATENT DOCUMENTS 6,753,860 B2 * 6/2004 Nelson .................... 345/441
6,879,717 B2 * 4/2005 Aggarwal et al. ........... 382/167

* cited by examiner

*Primary Examiner*—Kanji Patel
(74) *Attorney, Agent, or Firm*—Rozenblat IP LLC

(57) ABSTRACT

A method and system for determining a set of boundary points within a lattice is provided herein. The lattice is normalized into a regularly-spaced array and a first point within the array is selected. A software routine repeatedly locates boundary points by examining neighboring points and tracking array direction. The system includes a processor operatively connected to a display, an input device and a memory. The memory includes the software routine and the routine is executed on the processor. The output of the software routine is send to the display for viewing.

17 Claims, 7 Drawing Sheets

METHOD FOR DETERMINING A SET OF BOUNDARY POINTS IN A LATTICE

BACKGROUND OF THE INVENTION

1. Field of the Invention

The disclosure generally relates to methods for determining boundary points within a missile defense lattice and specifically relates to a method for determining boundary points within a lattice by determining a point within the lattice having a selected defense value and conducting sweeps to search for additional points within the lattice having the selected defense value until a set of boundary points is determined.

2. Background Description

In the area of missile defense, determination of a specified geographic region is required in which the particular region (Defended Area) can be protected from ground to ground missiles launched from another particular region (Launch Area). Current methods determine the Defended Area by defining two grids. The first grid defines a set of threat launch points. The second grid defines a set of potential threat impact points. A possible threat trajectory is determined for each pair of launch and impact points. Each threat trajectory is propagated from launch to impact via standard numerical integration methods for orbital mechanics. The process is repeated until all physically realizable combinations of threat launch points and threat impact points are propagated into a curve of threat trajectory points.

Currently each trajectory is evaluated to determine whether the threat can be detected by available sensors. If the threat is detectable, current methods determine whether the threat can be reached by available interceptors. The Launch Area Denied (LAD) is the region in which the threat trajectories originate, such that those trajectories can be both detected by the available sensors and reached by the available interceptors.

Current methods require a long run time (e.g., five or more hours) for reasonably large grids (e.g., one hundred threat launch points and one hundred threat impact points or ten thousand potential trajectories). A need exists for determining LAD in near real time (e.g., fifteen minutes or less), so that the effects of changes in sensor or interceptor location can be readily determined. Furthermore, current methods generally require that a lattice defining a geographic area be regularly spaced. Accordingly, a need exists for determining a set of boundary points within an irregularly spaced lattice in near real time.

Additionally, after numerical integration is complete, the raw data needs to be quickly deciphered and presented in a usable format. Accordingly, a method of determining a set of boundary points within a lattice is needed so that the raw computational data may be presented in an easy to read format.

The present invention is directed to overcoming one or more of the problems or disadvantages associated with the prior art.

SUMMARY OF THE INVENTION

A method and system for determining a set of boundary points within a lattice is provided herein. The lattice is normalized into a regularly-spaced array and a first point within the array is selected. A software routine repeatedly locates boundary points by examining neighboring points and tracking array direction. The system may include a processor operatively connected to a display, an input device and a memory. The memory may include the software routine and the routine may be executed on the processor. The output of the software routine may be sent to the display.

The features, functions, and advantages can be achieved independently in various embodiments of the present invention or may be combined in yet other embodiments.

BRIEF DESCRIPTION OF THE DRAWINGS

Objects, features, and advantages of the present invention will become apparent upon reading the following description in conjunction with the drawing figures, in which.

DETAILED DESCRIPTION

A method and system for determining a set of boundary points within a lattice as disclosed herein is particularly useful for rapidly determining the set of boundary points within the lattice, specifically a set of boundary points that may be defended by a missile defense network. The method may be used to rapidly determine a launch area denied (LAD) for missile defense systems. The method and system generally calculate a set of boundary points within the lattice. The method and system may use either a regularly spaced or irregularly spaced lattice (e.g., a lattice that includes points defined by latitude and longitude). The points do not have to be contiguous or regularly spaced as in previous methods. The method may begin by identifying a desired defense value, and determining a first boundary point within the lattice that corresponds to the desired defense value. The method may continue to analyze surrounding points within the lattice in a generally clockwise direction until a set of points is defined which represents a closed perimeter or boundary. The result is a group of outermost points of an area within the lattice that are defined with identical defense values, thus enabling a rapid graphical display of the set of boundary points.

Figure 1:
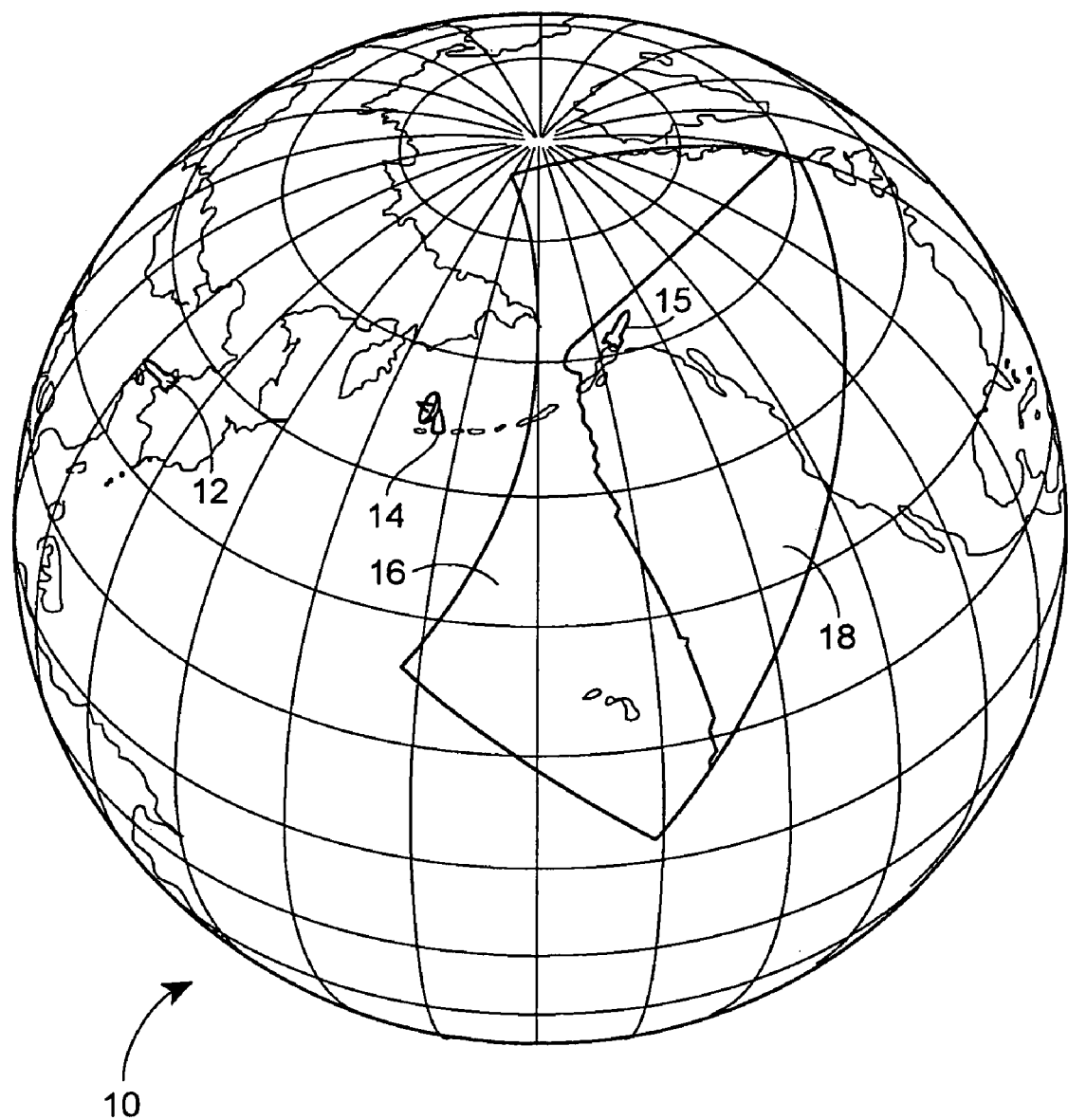
FIG. 1 is an example of a desired output display for LAD calculations.

FIG. 1 illustrates an example output of a boundary determining system. The output includes a map 10 showing a potential launch site 12, a potential sensor site 14, a potential interceptor launch site 15, a non-defended area 16 and a defended area 18. The non-defended area 16 and the defended area 18 together determine the total area reachable by an offensive missile launched from the potential launch site 12. The graphical representation shown in FIG. 1 is quickly readable and easily interpreted. The graphical representation is produced by the boundary determining system from a group of points (e.g., a lattice), each point having a defense value assigned thereto.

Figure 2:
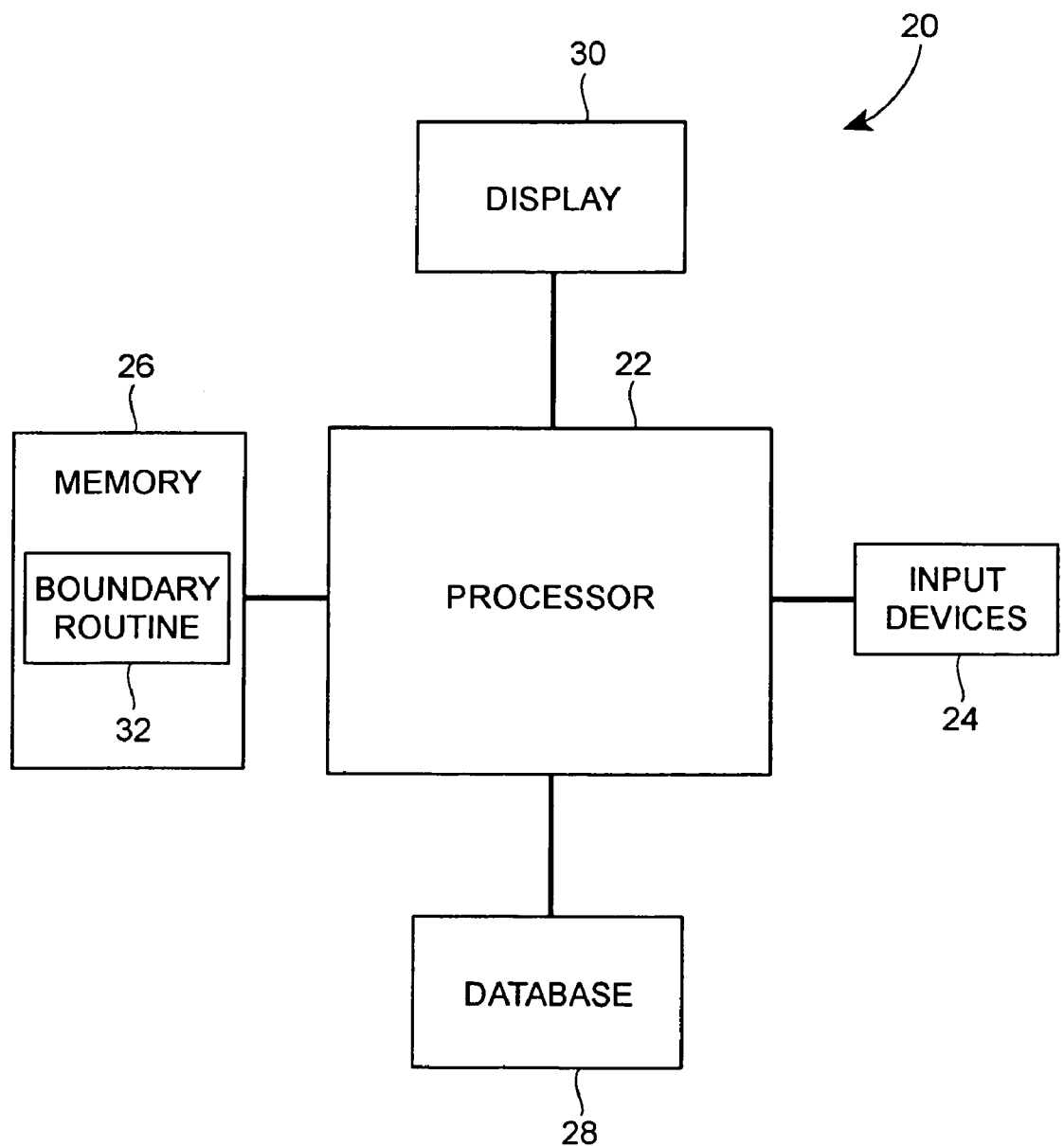
FIG. 2 is a schematic diagram of a boundary determining system.

FIG. 2 is a schematic diagram of one embodiment of a boundary determining system 20. The boundary determining system 20 includes a processor 22 operatively connected to an input device(s) 24, a memory 26, a database 28 and a display 30. The processor 22 accesses the memory 26 to load a boundary routine 32 that will be discussed in detail hereinafter. The input device 24, for example, a datalink, a keyboard, a disk drive, etc., provides a set of points in the form of a matrix or lattice, each of the points having at least one defense value assigned thereto. The processor 22 may use the boundary routine 32 to determine a certain set of boundary points for one or more specific defense values. Once the set of boundary points is determined, the processor 22 may access the database 28 to obtain map data, or other data that may be combined with the set of boundary points for output to the display 30. The database 28 may be contained in the memory 26 if desired.

Figure 3:
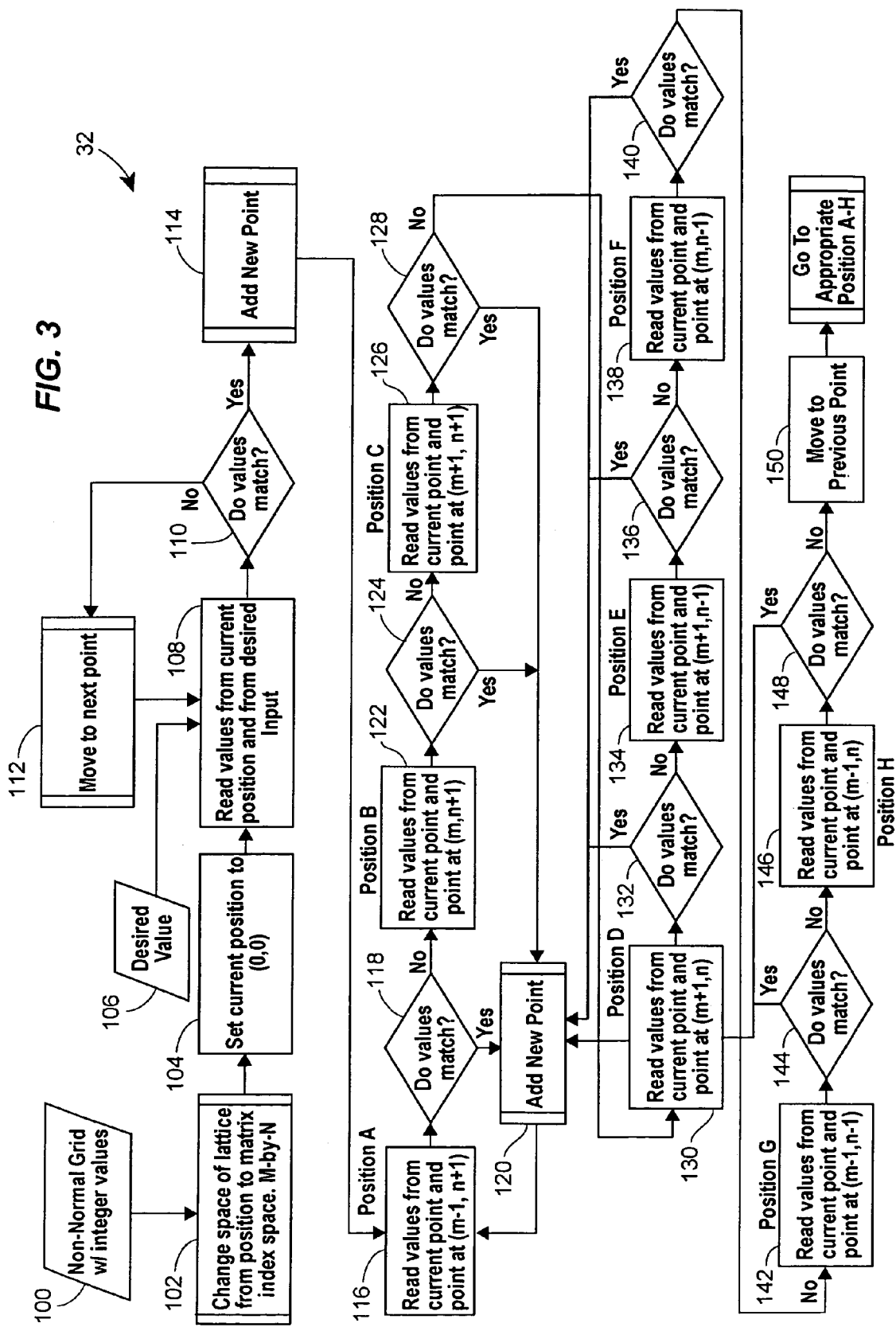
FIG. 3 is a logic diagram for a routine that may be used by the system of FIG. 2.

FIG. 3 is a logic diagram which illustrates logic that may be used by the boundary routine 32 to determine the set of boundary points within the lattice. Initially, the boundary routine 32 searches for a position in the lattice that includes a defense value that matches a desired defense value. The boundary routine 32 may input a non-normal lattice (or matrix or array) having integer values, at least one of which being a defense value, at step 100. The boundary routine 32 may access a subroutine at 102 (further discussed in FIG. 4) that mathematically manipulates the space of the lattice from position based to matrix index spaced. The effect of this manipulation at step 102 is to normalize the lattice, transforming the irregular lattice into a normal array. Searching a normal or regularly spaced array is much more efficient than searching a non-normal or irregularly spaced lattice. Next, a current position may be set to (0, 0), which represents the lower left corner of the array at step 104. The current position need not be (0, 0), any point in the array may be used as a starting point. A desired defense value is input at step 106 (e.g., 0, 1, or 2). The desired defense value may be input from the input device 24 or pre-selected and entered into the routine 32. Alternatively, the boundary routine 32 may analyze the array for a plurality of possible defense values in a sequential manner. The defense value for the current position and the desired defense values are read at step 108.

In this embodiment, the relevant defense value is a whole integer, either 0, 1, or 2. The "0" may represent a point which is defended. The "1" may represent a point which is not defended, but reachable by an offensive missile. The "2" may represent a point which is not defended and not reachable by the offensive missile. Next, the defense value from the current position and the desired defense value may be compared at step 110. If the defense values from step 110 do not match, the boundary routine 32 may move to another point. The logic for moving to the next point in the array at step 112 will be discussed with reference to FIG. 5 below. This loop, steps 108-112, is continued until a point is found within the array having a defense value that matches the desired defense value.

When a current position is found having a defense value that matches the desired defense value, the current position is identified as the first boundary point, and stored at step 114. The current position may be "flagged" in the array, or saved in new memory, which represents a set of boundary points. Next, the boundary routine 32 may proceed with an analysis of adjoining positions within the array. The routine embodied in FIG. 3 begins this analysis in a generally clockwise manner, beginning at an upper left position roughly corresponding to a 10:30 position on a clock face. However, the analysis may be conducted in virtually any direction. For example, adjacent positions may be searched in counterclockwise, random, or opposing directions if desired as long as each adjoining position in the array is analyzed. The boundary routine 32 embodied in FIG. 3 may then read the defense value associated with a position A having position coordinates in the array of (m−1, n+1), where the current position is indicated as (m, n), at step 116. If the defense value of position A matches the desired defense value at step 118, position A is checked to ensure that position A does not match the first boundary point. If position A does not match the first boundary point, position A may be identified as a subsequent boundary point and stored at step 120 in the same way the current position was identified as the first boundary point at step 114.

Furthermore, if the defense value of position A matches the desired defense value at step 118, position A may be designated as the new current position (i.e., the position coordinates of position A (m−1, n+1) become the new (m, n)). Accordingly, the boundary routine 32 may then return to step 116 and identify a new position A (m−1, n+1) and read the appropriate defense value for the new position A. Again, the defense value for new position A may be compared to the desired defense value at step 118. This loop may be repeated until the defense value for new position A does not match the desired defense value at step 118.

If the defense value of position A does not match the desired defense value at step 118, the boundary routine 32 may move to position B (m, n+1), roughly corresponding to a 12 o'clock position on a clock face, and reads the defense value corresponding to position B at step 122. Similar to position A, the defense value for position B may be compared the desired defense value at step 124 and if the defense value for position B matches the desired defense value, position B may be checked to ensure that position B is not the same as the first boundary point for this particular defense value. If position B does not match the first boundary point, position B may be identified as a subsequent boundary point and stored at step 120. Thereafter, position B may become the current position and a new position A may be identified at step 116.

If the defense value of position B does not match the desired defense value at step 124, the boundary routine 32 may proceed to analyze position C (m+1, n+1), roughly corresponding to a 1:30 position on a clock face, and read the defense value corresponding to position C at step 126. Similar to position A, the defense value for position C may be compared the desired defense value at step 128 and if the defense value for position C matches the desired defense value, position C may be checked to ensure that position C is not the same as the first boundary point for this particular defense value. If position C does not match the first boundary point, position C may be identified as a subsequent boundary point and stored at step 120. Thereafter, position C may be designated as the current position and a new position A is identified at step 116.

If the defense value of position C does not match the desired defense value at step 128, the boundary routine 32 moves to position D (m+1, n), roughly corresponding to a 3 o'clock position on a clock face, and reads the defense value corresponding to position D at step 130. Similar to position A, the defense value for position D may be compared the desired defense value at step 132 and if the defense value for position D matches the desired defense value, position D may be checked to ensure that position D is not the same as the first boundary point for this particular defense value. If position D does not match the first boundary point, position D may be identified as a subsequent boundary point and stored at step 120. Thereafter, position D may be designated as the current position and a new position A is identified at step 116.

If the defense value of position D does not match the desired defense value at step 132, the boundary routine 32 may move to position E (m+1, n−1), roughly corresponding to a 4:30 position on a clock face, and may read the defense value corresponding to position E at step 134. Similar to position A, the defense value for position E may be compared the desired defense value at step 136 and if the defense value for position E matches the desired defense value, position E may be checked to ensure that position E is not the same as the first boundary point for this particular defense value. If position E does not match the first boundary point, position E may be identified as a subsequent boundary point and stored at step 120. Thereafter, position E may be designated as the current position and a new position A is identified at step 116.

If the defense value of position E does not match the desired defense value at step 136, the boundary routine 32 may move to position F (m, n−1), roughly corresponding to a 6 o'clock position on a clock face, and may read the defense value corresponding to position F at step 138. Similar to position A, the defense value for position F may be compared the desired defense value at step 140 and if the defense value for position F matches the desired defense value, position F may be checked to ensure that position F is not the same as the first boundary point for this particular defense value. If position F does not match the first boundary point, position F may be identified as a subsequent boundary point and stored at step 120. Thereafter, position F may be designated as the current position and a new position A is identified at step 116.

If the defense value of position F does not match the desired defense value at step 140, the boundary routine 32 may move to position G (m−1, n−1), roughly corresponding to a 7:30 position on a clock face, and may read the defense value corresponding to position G at step 142. Similar to position A, the defense value for position G may be compared the desired defense value at step 144 and if the defense value for position G matches the desired defense value, position G may be checked to ensure that position G is not the same as the first boundary point for this particular defense value. If position G does not match the first boundary point, position G may be identified as a subsequent boundary point and stored at step 120. Thereafter, position G may be designated as the current position and a new position A is identified at step 116.

If the defense value of position G does not match the desired defense value at step 144, the boundary routine 32 may move to position H (m−1, n), roughly corresponding to a 9 o'clock position on a clock face, and may read the defense value corresponding to position H at step 146. Similar to position A, the defense value for position H may be compared the desired defense value at step 148 and if the defense value for position H matches the desired defense value, position H may be checked to ensure that position H is not the same as the first boundary point for this particular defense value. If position H does not match the first boundary point, position H may be identified as a subsequent boundary point and stored at step 120. Thereafter, position H may be designated as the current position and a new position A is identified at step 116.

If at any time, any of points A-H are determined to be the same point as the first boundary point, the boundary is complete and another search may begin.

Figure 7:
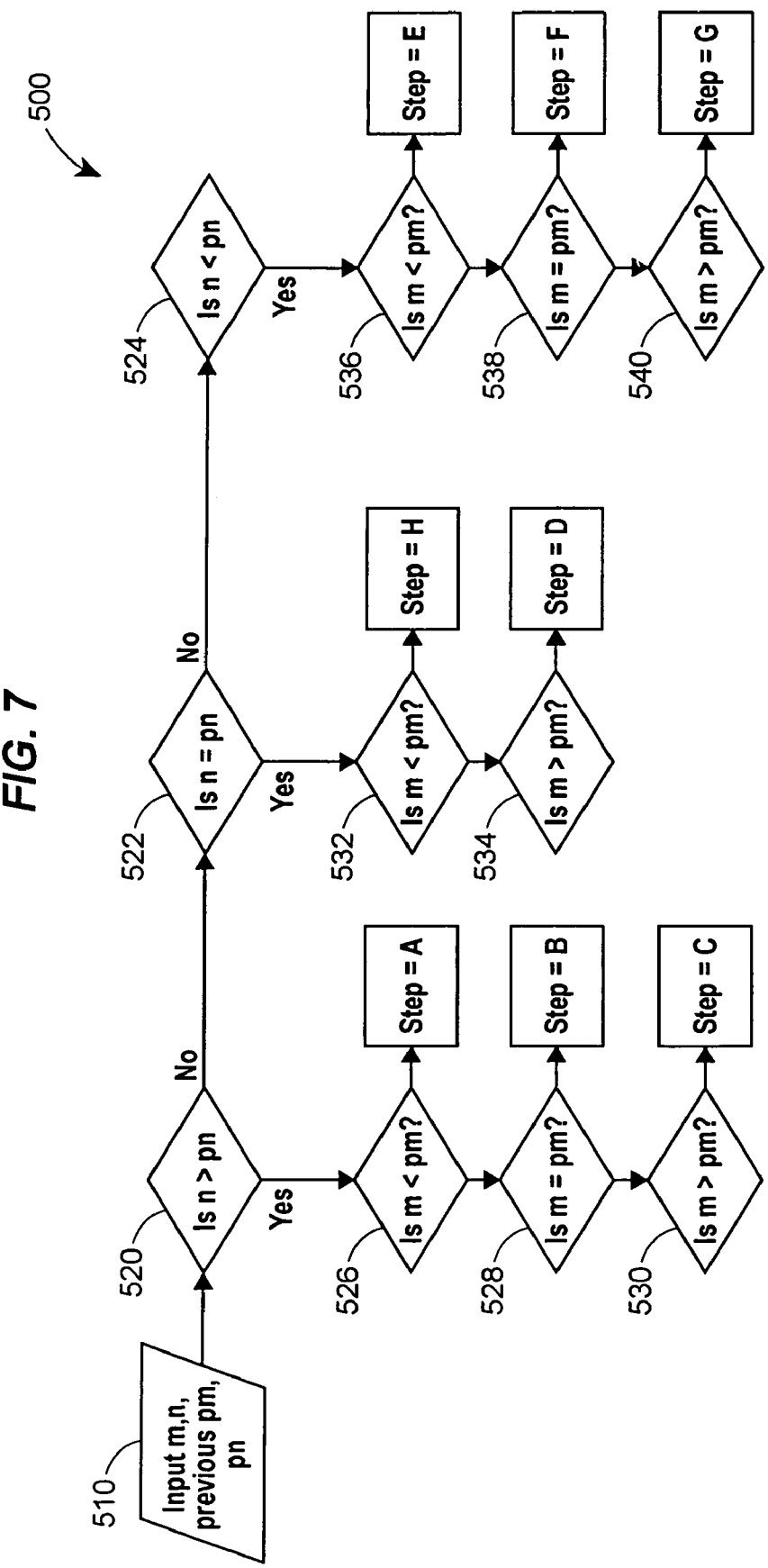
FIG. 7 is a logic diagram of a fourth sub-routine that may be used by the routine of FIG. 3.

If the defense value of position H does not match the desired defense value at step 148, the routine may move back to a previous point, discussed further with reference to FIG. 7, and may continue the analysis until a point is identified which is the same as the first boundary point.

Figure 4:
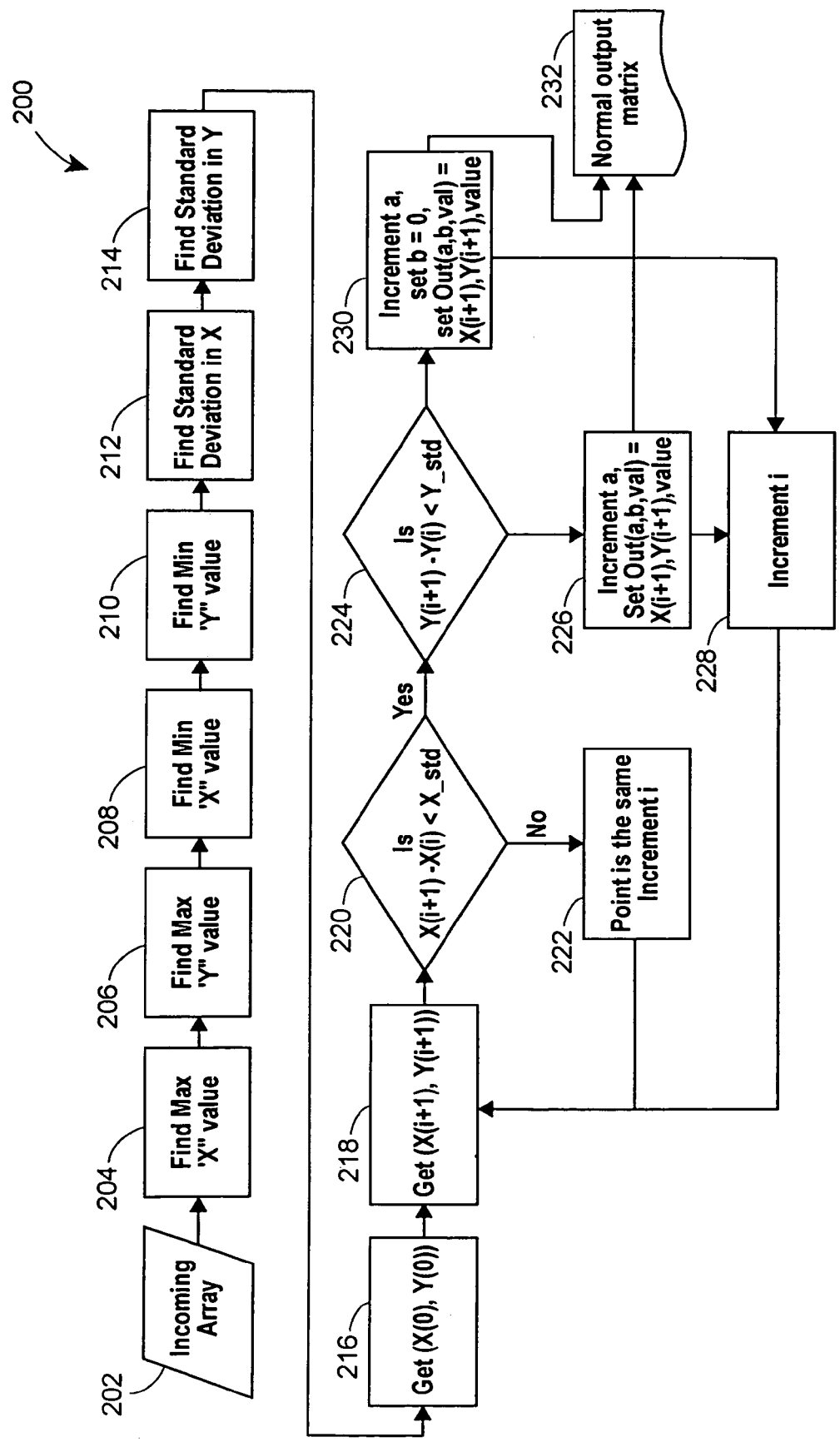
FIG. 4 is a logic diagram of a sub-routine that may be used by the routine of FIG. 3.

FIG. 4 represents a sub-routine that may be used at step 102 of FIG. 3 which normalizes the lattice by changing the space of the lattice from position space to matrix index space. In doing so, the subroutine of FIG. 4 transforms any irregularly spaced lattice into a regularly spaced array. The sub-routine is generally represented at 200. The incoming array at 202 may be analyzed for maximum and minimum "X" and "Y" values at steps 204-210. Then, a minimum separation distance is calculated by finding the distance between any two points using the maximum and minimum values of "X" and "Y" as markers at 212-214. Once the minimum separation distance is found for both the x and y directions (e.g., in the N-S and E-W directions) the points may be loaded into a normally arranged array. Select a point in the irregular lattice and insert it into the new array as point (0,0) at 216. A second point may then be analyzed in the irregular lattice at 218-230 to determine how far the second point is from the first point in both the x and y directions. If the second point is more than the minimum "X" distance in the x direction and less than twice the minimum "X" distance in the x direction, the second point may be assigned to column 1 in the Normal Output array at 232. If the second point is more than the minimum "Y" distance in the y direction and less than two times the minimum "Y" distance in the y direction, the second point may be assigned to column 1 in the Normal Output array at 232. Thus, the position of the second point in the irregular lattice is transformed to a position of (1,1) in the Normal Output array. Subsequent points from the irregular lattice may be analyzed and transformed in a similar manner as in steps 218-232. The result is a regularly spaced array (Normal Output) that contains the same information as the irregular lattice. The first point selected at 216 may be any point in the irregular lattice. However, the irregular lattice is transformed into a regular array such that no negative indices exist.

Figure 5:
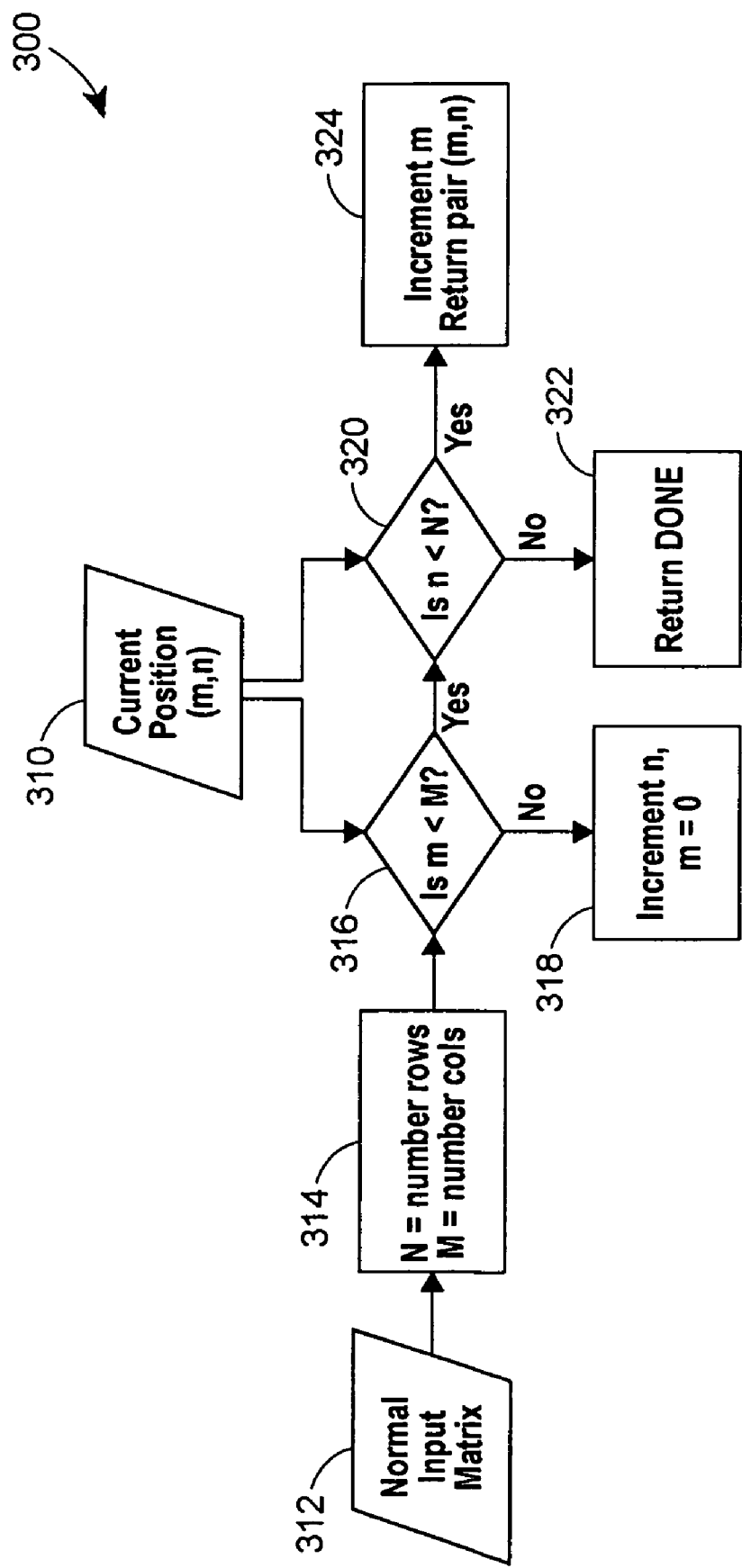
FIG. 5 is a logic diagram of a second sub-routine that may be used by the routine of FIG. 3.

The sub-routine in FIG. 5, generally identified as reference number 300, may be used to move to another point if the current position defense value does not match the desired defense values at step 112 of FIG. 3. The current position having positional values of (m, n) may be input at step 310. The normalized array from step 102 of FIG. 3 may be input at 312. The normalized array may be defined by a number of rows (N) and a number of columns (M) at 314. Next, the column value (m) of the current position may be compared to the number of columns (M) at 316. If the column value (m) is not less than (M), the sub-routine 300 may determine that the next point has position coordinates (0, n+1) at 318. If the column value (m) is less than (M), the row value (n) may be compared to the number of rows (N) at 320. If the row value (n) is not less than (N), the sub-routine is complete at 322 and the sub-routine of FIG. 5 informs the boundary routine 32 (FIG. 3) that there are no more points in the array to consider. If, however, the column value (m) is less than (M) and the row value (n) is less than (N), then the sub-routine 300 may incrementally raise the column value (m) and the resulting new point may have position (m+1, n) at 324.

Figure 6:
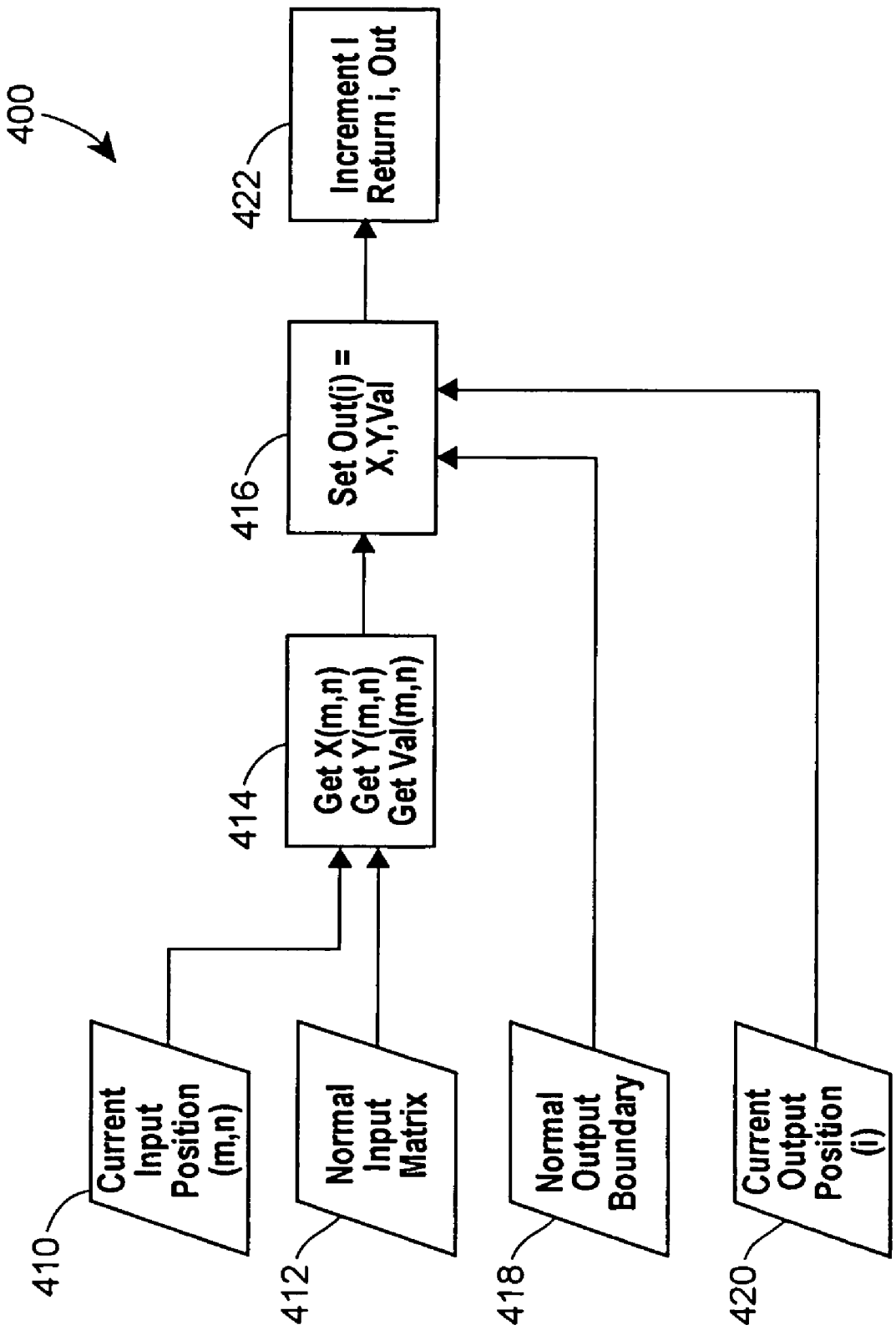
FIG. 6 is a logic diagram of a third sub-routine that may be used by the routine of FIG. 3.

The sub-routine in FIG. 6, generally identified as reference number 400, may be used to identify a new point that has a defense value which corresponds to the desired defense value. The current position (m, n) and the normalized array may be input at 410 and 412 respectively. The "X," "Y," and defense values may be determined at 414. A Normal Output Boundary is a list of points and is input at 418. This Normal Output Boundary is a set of boundary points that have already been determined by the boundary routine 32. Additionally, the Current Output Position is input at 420. The Current Output Position is the current position in an output array. For example, if there were already two points in the Normal Output Boundary array, then "i" would be the third index or "2" in the case of an array indexed from zero. The "X," "Y," and defense values for the current point are combined with the Normal Output Boundary and the Current Output Position at 416 generally adding, the current position (m,n) to the Normal Output Boundary. Step 422 generally increments "i", thus tracking how many boundary points have been found and returning the output array with the new boundary point added.

The sub-routine 400 generally performs a bookkeeping function by tracking new boundary points and determining a position in the output array for the next boundary point.

The sub-routine in FIG. 7 may determine which position (A-G) the boundary routine 32 moves to at step 150 in FIG. 3. This sub-routine is generally identified as reference number 500. Both the current position (m, n) and the previous position (pm, pn) may be input at 510. The current position row value (n) may be compared to the previous position point row value (pn) at 520-524. If the current position row value (n) is greater than the previous position row value (pn) at 520, then the current position column value (m) may be compared to the previous position column value (pm) at 526-530. If the current position column value (m) is less than the previous position column value (pm) at 526, then the previous point is position A. If the current position column value (m) is equal to the previous position column value (pm) at 528, then the previous point is position B. If the current position column value (m) is greater than the previous position column value (pm) at 530, then the previous point is position C.

If the current position row value (n) is equal to the previous position row value (pn) at 522, then the current position column value (m) may be compared to the previous position column value at 532-534. If the current position column value (m) is less than the previous position column value (pm) at 532, then the previous point is position H. If the current position column value (m) is greater that the previous position column value (pm) at 534, then the previous point is position D.

Finally, if the current position row value (n) is less than the previous position row value (pn), then the current position column value (m) may be compared to the previous position column value (pm) at 538-540. If the current position column value (m) is less than the previous position column value at 536, then the previous point is position E. If the current position column value (m) is equal to the previous position column value (pm) at 538, then the previous point is position F. Likewise, if the current position column value (m) is greater than the previous position column value (pm) at 540, then the previous point is position G.

One skilled in the art will realize that this method of determining boundaries for a lattice may be applied equally as well to lattices having three or more dimensions as to two dimensional lattices. Furthermore, while the method described herein generally analyzes a lattice in a clockwise direction beginning with an upper left adjacent point, the direction of analysis and beginning point may be determined by one of ordinary skill in the art based on particular parameters and/or desired outputs.

The output of the method is a set of points having common defense values. This set of points represents a boundary of an area. The set of points may be combined with map data for transmittal to a display screen for rapid viewing. The method may include performing linear interpolation between boundary points before combining with the map data for the purpose of providing a continuous boundary perimeter which encloses an area. Furthermore, the area defined within the boundary may be filled or colored for even faster interpretation. Because graphical or analog data is more easily interpreted than digital data, graphical display of a map with boundaries depicted thereon is more useful than a mathematical lattice of points. In addition to the advantages of rapid display and interpretation, the method is computationally low cost because it requires no extensive numeric calculations.

While the system and method herein have been generally described with reference to missile defense systems, the method may be applied equally as well to any problems where boundaries are determined for matrices, lattices, or arrays.

Although the preferred embodiments of the invention have been disclosed for illustrative purposes, those skilled in the art will appreciate that various modifications, additions, and substitutes are possible, without departing from the scope and spirit of the invention as disclosed herein and in the accompanying claims.

Other aspects and features of the present invention can be obtained from a study of the drawings, the disclosure, and the appended claims.

What is claimed is:

1. A method for determining a boundary of an area within a lattice, the method comprising:
   providing a processor loaded with a boundary routine;
   normalizing, using the boundary routine of the provided processor, a list of points from the lattice into a regularly-spaced array;
   selecting, using the boundary routine of the provided processor, a first boundary point from the array;
   repeatedly locating, using the boundary routine of the provided processor, boundary points by examining neighboring points within the array and tracking array direction; and
   interpolating, using the boundary routine of the provided processor, between boundary points.

2. The method of claim 1, wherein the lattice is irregularly spaced.

3. The method of claim 1, wherein, using the boundary routine of the provided processor, an area defined within a perimeter formed by the boundary points is filled.

4. The method of claim 1, wherein, using the boundary routine of the provided processor, a subsequent boundary point is located by analyzing a value associated with a neighboring point and comparing the value to a desired value.

5. The method of claim 1, wherein, using the boundary routine of the provided processor, an initial neighboring point is selected as an upper left hand neighboring point in the array.

6. The method of claim 5, wherein, using the boundary routine of the provided processor, subsequent neighboring points are analyzed in a clockwise direction.

7. The method of claim 1, wherein the lattice is a two-dimensional lattice.

8. The method of claim 1, wherein the lattice is a three-dimensional lattice.

9. The method of claim 1, wherein, using the boundary routine of the provided processor, subsequent boundary points are checked to determine if any one of the subsequent boundary points is the same as the initial boundary point.

10. The method of claim 1, wherein, using the boundary routine of the provided processor, the routine performs a linear interpolation between boundary points.

11. A method for determining a boundary of an area within a lattice, the method comprising:
    providing a processor loaded with a boundary routine;
    inputting a lattice using the boundary routine of the provided processor;
    normalizing, using the boundary routine of the provided processor, the first lattice by transforming x and y coordinates of the first lattice into i and j coordinates of an array, each point within the array having a defense value assigned thereto;
    selecting, using the boundary routine of the provided processor, a starting position within the array;
    defining, using the boundary routine of the provided processor, a desired defense value;

comparing, using the boundary routine of the provided processor, the defense value of the starting position to the desired defense value;

iteratively moving, using the boundary routine of the provided processor, the starting position until a starting position is found that matches the desired defense value and defining the starting position as the first boundary point;

analyzing, using the boundary routine of the provided processor, points within the array that are adjacent to the first boundary point and comparing respective defense values to the desired defense value;

defining, using the boundary routine of the provided processor, points having defense values equal to the desired defense value as subsequent boundary points thereby forming a set of boundary points;

combining, using the boundary routine of the provided processor, the set of boundary points with map data to produce a map display having the set of boundary points displayed thereon.

12. The method of claim 11, further comprising linearly interpolating, using the boundary routine of the provided processor, between the set of boundary points to produce a continuous boundary perimeter before combining the set of boundary points with the map data.

13. A system for identifying a set of boundary points within a lattice, the system comprising:
   a processor operatively coupled to an input device;
   a display operatively coupled to the processor; and
   a memory operatively coupled to the processor,
   wherein the memory includes a boundary routine adapted to be executed on the processor, and the boundary routine is adapted to normalize a lattice received from the input device, analyze each point in the normalized lattice for a particular defense value, and identify each point in the normalized lattice having the particular defense value, thereby producing a set of boundary points, and sending the set of boundary points to the display.

14. The system of claim 13, wherein the routine linearly interpolates between each point in the set of boundary points, thereby defining a boundary perimeter.

15. The system of claim 14, wherein the boundary perimeter is filled.

16. The system of claim 13, wherein the boundary routine analyzes adjacent points in the normalized lattice in a generally clockwise fashion from a previously identified boundary point.

17. The system of claim 13, wherein the set of boundary points is combined with map data before being sent to the display.

* * * * *